Patented Aug. 5, 1952

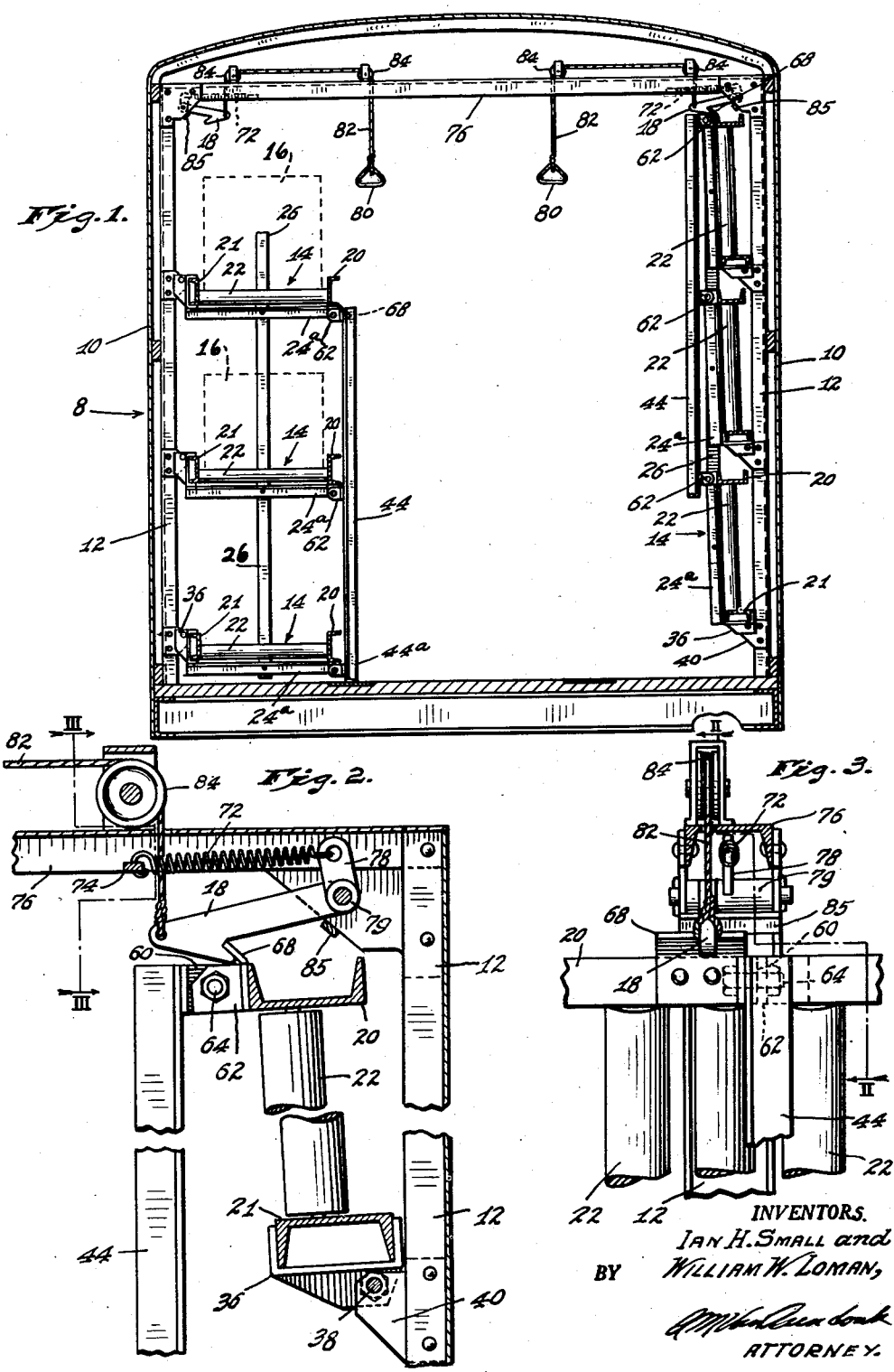

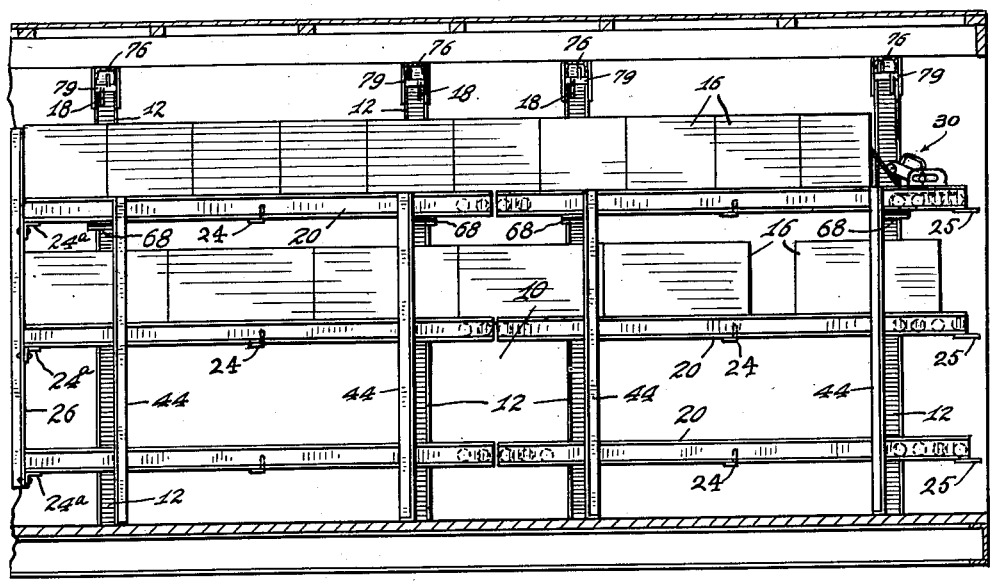
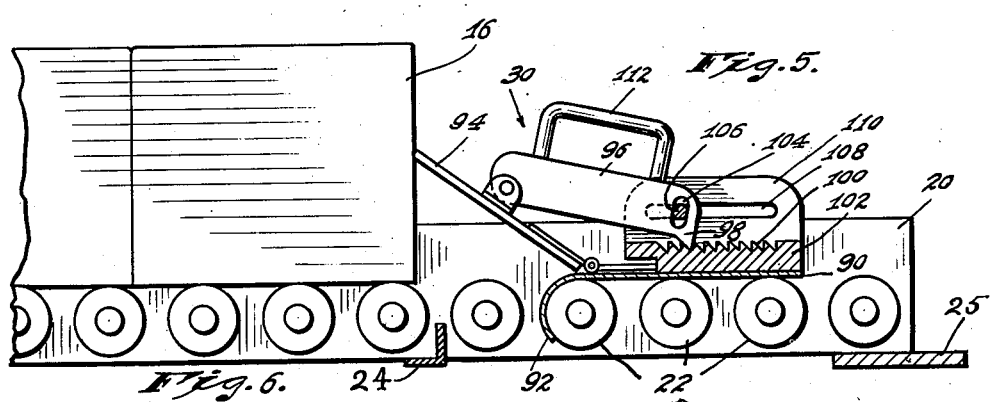
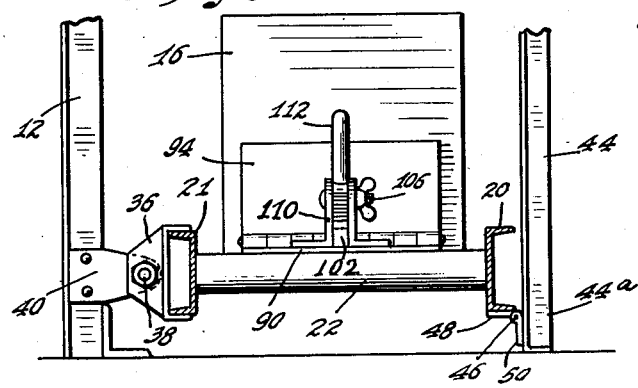
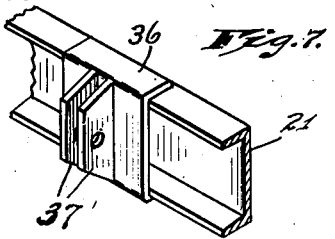

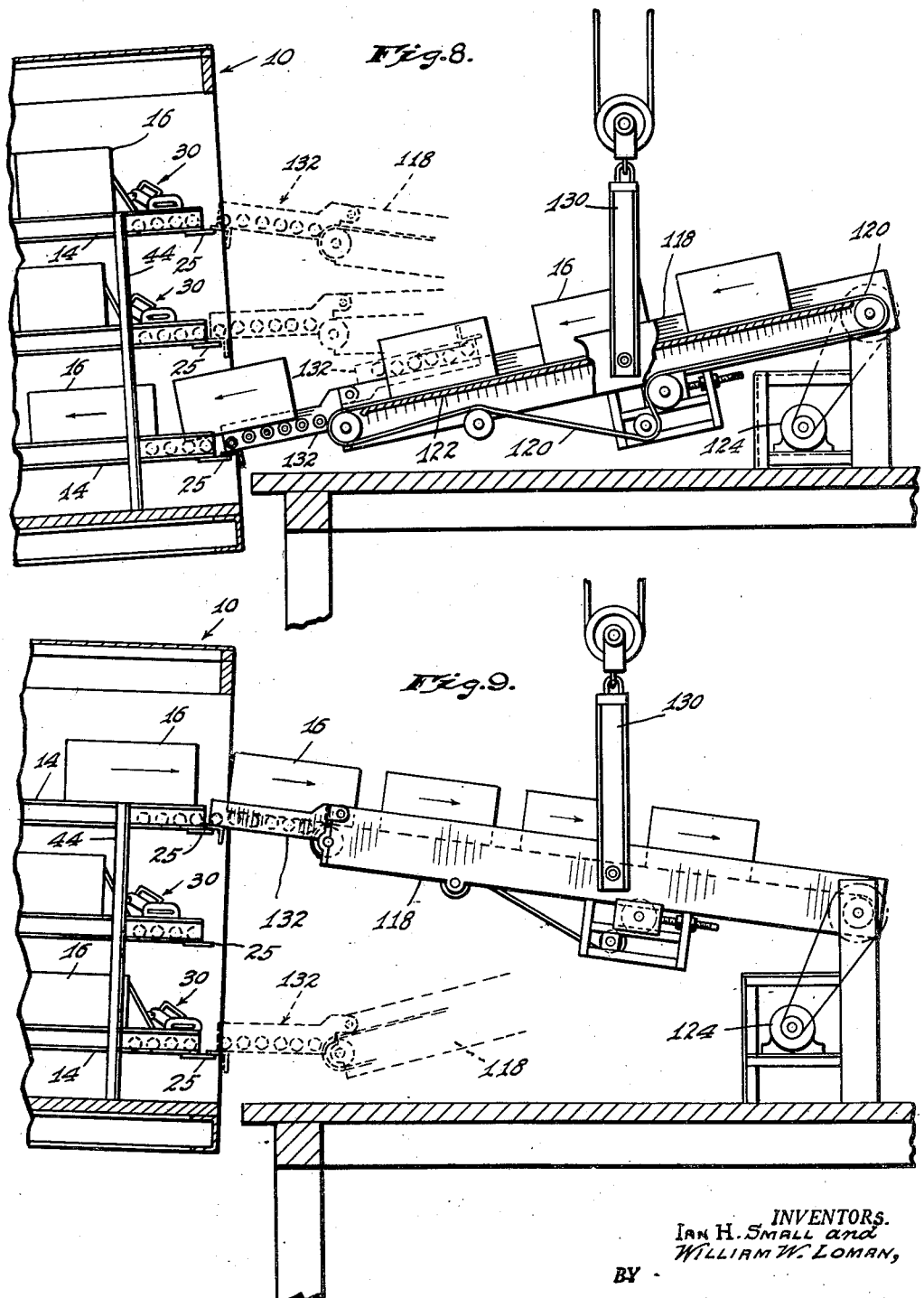

2,605,912

UNITED STATES PATENT OFFICE 2,605,912

MECHANISM FOR TRANSPORTING LOADS

Ian H. Small and William W. Loman, Indianapolis, Ind., assignors to Eli Lilly and Company, Indianapolis, Ind., a corporation of Indiana Application September 25, 1947, Serial No. 776,002

1 Claim. (Cl. 214—38)

This invention relates to mechanism for handling and transporting loads comprising packages and the like, and more particularly to load-handling mechanism and load-carrying vehicles for use therewith.

An object of our invention is to provide novel load-handling and load-carrier mechanism which will facilitate the transportation of loads comprising articles, such as packages and the like, with a minimum of manual labor, especially where the articles are of generally uniform size, and to provide load-handling mechanism and a load-carrying vehicle which in co-operation therewith will permit rapid, efficient and expeditious delivery of articles, such as packages, from one station to another. Another object of our invention is to provide a vehicle with load-carrier mechanism which will facilitate the loading and unloading of packages of generally uniform size, which mechanism will impose a minimum of restriction on the general use of the vehicle for indiscriminate loads. Another object of our invention is to provide loading station mechanism which will co-operate with the carrier mechanism of the vehicle and which in combination therewith will permit the loading and unloading of packages directly from or to a conveyor line.

In accordance with our invention, a vehicle body, which may be of any standard construction, is provided with one or more tiers of a plurality of special conveyor sections, and the several conveyor flights are mounted on horizontal pivot axes adjacent the side walls of the vehicle and are movable between horizontal load-supporting positions and vertical storage positions. At one or more stations, load handling mechanism is provided, including a power-operated conveyor movable into alignment with the several load carriers of the vehicle.

In the illustrated construction, the load carriers take the form of sections of conveyors arranged one above the other in tiers along opposite sides of a vehicle body, in an arrangement which includes means at the inner edges of said sections pivotally connected to and interconnecting all of the sections of each tier, so that the sections of a whole tier may be moved together to folded position for storage against a side of the vehicle body. In a preferred construction, these conveyor sections comprise elements which are pivoted to supporting structures secured to the vertical walls of the vehicle body so that the conveyors may be folded in a compact arrangement against such vehicle walls. It is a feature of the invention that the conveyor sections are pivotally interconnected by supporting members which move with the conveyors to a folded compact arrangement, the said interconnecting members being so arranged as to serve as supports for the conveyors when they are in load-carrying position.

Other features of the invention are the means for latching the conveyors in inoperative, folded position against the side walls of the vehicle body, and for enabling a worker to release the latching means when it is desired to return the sections of conveyors to operative position.

In the preferred construction, the load-carrying sections comprise side members which support freely rotatable rollers in a load-supporting arrangement, and which extend above the tops of the rollers to prevent lateral displacement of packages or other articles on the carrier.

Other important features of the invention will appear from the following specification and claim.

The accompanying drawings illustrate our invention. In the drawings:

Fig. 1 is a view looking into the rear end of a truck body provided with conveyor arrangements in accordance with this invention;

Fig. 2 is an enlarged view of the latch mechanism shown at the upper end of the folded conveyors at the right in Fig. 1, Fig. 2 being a section taken along the line II—II of Fig. 3;

Fig. 3 is a view taken along the line III—III of Fig. 2;

Fig. 4 is a view in side elevation of the conveyors along one side of the truck shown in Fig. 1, with the conveyors in load-supporting position, and showing the conveyors arranged in two separately foldable sections.

Fig. 5 is an enlarged view of a stop or holding device in place to hold packages against displacement, a similar holding device being shown in connection with the uppermost conveyor in Fig. 4;

Fig. 6 is a rear view of a holding device in place upon the lowermost conveyor;

Fig. 7 is an isometric view of a pivot-engaging bracket on the side of a roller conveyor, and by which it is connected to a vertical supporting brace.

Fig. 8 is a view in side elevation, and partly in section, of a loading and unloading conveyor in relation to a truck body in loading position; and Fig. 9 is a view similar to Fig. 8 but showing the truck in unloading position.

Fig. 1 shows truck body 8 having vertical side walls 10 provided with reinforcing braces 12 which serve as supporting members for a plurality of load carriers in the form of roller conveyors 14. As shown, the three conveyors 14 at the left in Fig. 1 are in open or load-carrying position, with cartons 16 indicated in dash lines shown in loaded position upon the upper two roller conveyors. At the right in Fig. 1, there is also shown a plurality of roller conveyors 14 in folded position adjacent to the upright side wall 10 of the truck, where they are held by releasable latches 18. The carriers on each side of the truck body desirably are in two or more tier sections.

Each conveyor 14 comprises a frame made up of side channel bars 20 and 21 connected by cross pieces 24 and 24a, and a multiplicity of spaced rollers 22 are mounted on suitable anti-friction bearings carried by the frame members. Conveniently also there is provided a shelf 25 which connects said bars 20 and 21 and projects from their rear ends to serve as a rest for an adjustable loading and unloading conveyor which may be aligned with each of the conveyors 14 in turn. Conveniently and as shown, the side bars 20, 21 of each conveyor 14 extend substantially above the level of the upper surfaces of the rollers 22, thus providing means for preventing lateral displacement of the articles loaded on the conveyor. As shown most clearly in Figs. 1 and 2, each outer side bar 21 of the roller conveyors is fitted into and secured, as by welding, to bracket members 36, each of which has spaced projections 37 pivotally connected as by a bolt 38 to plates 40 securely riveted to the uprights 12 of the supporting structure, the purpose of the pivotal connection being to permit folding of the conveyors 14 against the upright wall 10 of the truck body when they are not in use, for instance, when it is desired to transport in the truck packages larger than the conveyors are designed to receive.

As auxiliary means for supporting the roller conveyors 14 when they are in load-carrying position, the inner side channels 20 of said conveyors have connected thereto supporting bars or posts 44, the said posts being pivotally connected to the side bars 20 of the conveyors adjacent their lower edges.

As shown in Figs. 1 and 2, the supporting members or posts 44 are connected to the roller conveyors 14 by pivotal connecting devices each comprising an ear 60 (Fig. 2) riveted to said member 44 and receivable in a bracket 62 riveted to the lower side wall of the channel bar 20, the ear being secured within the bracket 62 by a pivot bolt 64. An alternative construction is shown in Figs. 6 and 7, where the pivotal connection between the conveyors 14 and the supporting member 44 is by pivot members or pintles 46 passing through interengaging knuckles on hinge plates 48 and 50, riveted or welded respectively to side bar 20 of the conveyors 14 and to the posts 44. Figs. 6 and 7 also show a somewhat modified connection between the conveyors 14 and the side supports 12, the main difference being that the pivot holes are positioned centrally of the projections 37.

By reason of the pivotal connection between the vertical posts 44 and the several roller conveyors 14, the posts and the conveyor of each tier section will all move together to storage position into approximately parallel relation with respect to the sides of the truck, as shown at the right in Fig. 1. The bars or posts 44 constitute interconnecting and supporting members for the inner free sides of the conveyors 14 and the lower end portion 44a of each bar 44 is in effect a post connected to the lowermost roller conveyor and adapted to rest upon the floor of the truck to support all of the conveyors in work-receiving position. The bars 44 which interconnect the side channels 20 of the roller conveyors 14 need not be integral with or even aligned with the posts 44a which are connected to the lowermost conveyor and which give support to the conveyors when in work-supporting position.

At their front ends, i. e., at the front end of the truck 8, the roller conveyors 14 of the front tier section are all pivotally connected to a vertical bar 26 which serves both as an additional connection between the conveyors 14 and also as a stop against which the frontmost carton 16 is held when the conveyor is loaded. Conveniently, the bar 26 is pivoted to cross pieces 24a at the front ends of the conveyors 14.

When the conveyors are folded against a side 10 of the truck body, latch means 18 is utilized to hold them releasably in such position. For co-operation with the latch 18, there is provided a lip member 68 (Figs. 1, 2 and 3) in the form of an angle plate riveted to the lower side wall of the channel bar 20 of the uppermost roller conveyor. As illustrated, the latch 18 (Fig. 2) is yieldingly urged into co-operative relation with the lip member 68 by means of a spring 72 connected to a stud 74 rigid with a cross bar 76 extending between the upper ends of the braces 12, the other end of the spring 72 being engaged with an arm 78 rigidly connected to the hub 79 of the latch member 18. A latch-releasing cable 82 passes over rollers 84 to a stirrup 80 conveniently positioned to be pulled down by an operator. To facilitate release of the latch, the roller conveyors 14 may be moved to some extent toward the wall 10 as the latch release stirrup is pulled. When the conveyors 14 are moved to closed position, the latch is lifted by the lip member 68 and is moved to latching position by the spring 72 as the lip member 68 passes it.

In order that one worker easily may shift the conveyors into operative position and inoperative or folded position, the conveyors may be constructed in short sections as shown in Fig. 4, the sections being arranged in end-to-end relationship and functioning as one conveyor at each level.

When a conveyor is loaded and the rearmost carton is in position, a stop device 30 is dropped upon the next adjacent rollers and firmly holds the line of packages against displacement or discharge in an endwise direction during operation of the truck.

The stop device or holding member 30, shown in operative position in Figs. 4, 5 and 6, comprises a base plate 90 (Fig. 5) having a curved hook 92 for engagement selectively with one of the rollers 22, the said base member 90 having pivoted thereto a package-engaging member 94 arranged to be held in its operative position by a latch 96 pivoted to said member 94 and having a pawl end for selective engagement with one of the teeth 100 on a rack bar 102 securely attached to the base member 90. As shown, the pawl end of the latch member 96 is provided with a vertical slot 104 for slidably engaging a bolt 106 which is constrained to move along aligned slots 108 in spaced guide members 110 riveted to and extending upwardly from base member 90. Preferably the latch 96 has attached thereto a handle 112 by which the pawl end of the latch 96 may be retracted from its engagement with the rack 102 to release the work-engaging member 94 and to lift the whole stop member 30 from its position to the roller conveyor. The stop device or holding member 30 is used to hold the cartons or packages 16 against displacement after they have been assembled on a given roller conveyor, and said stop or holding device may be readily applied in its holding position, or removed therefrom when it is desired to unload the given conveyor. This stop or holding device is the invention of one of us, Ian H. Small, and forms the subject matter of copending application Serial No. 776,001, filed September 25, 1947.

The loading and unloading of a truck body provided with a conveyor arrangement in accordance with our invention may be greatly expedited by employing the load handling mechanism 118 shown in Figs. 8 and 9. This comprises a power-driven belt 120, passing over pulleys in a suitable frame, with its upper run supported by a smooth surfaced plate 122, and driven through one of the pulleys by a motor 124. In order that the belt conveyor 118 may be selectively positioned with respect to the conveyors 14 at different levels in the truck body, the belt conveyor is pivotally mounted at its rear end and means is provided for lifting and lowering said conveyor, the said means comprising a hoist (not shown) connected to the conveyor 118 by a yoke 130 embracing and pivotally connected to said conveyor.

At its forward end, said load-handling conveyor 118 has pivotally connected thereto a flexible extension, such as a roller section 132 which may be readily turned backwardly into inoperative position as shown in dotted lines in Fig. 8. When in operative position, the roller section 132 provides a bridge which engages and rests upon any one of the shelves 25 fastened to the rear ends of the conveyors 14 of the truck body. Movement of the bridge 132 to or toward its inoperative position permits the conveyor 118 to pass from one shelf 25 to another as it is aligned selectively with the conveyors 14 in the truck.

As indicated in Fig. 8, the ramp at the loading station is desirably so constructed that a truck in loading position has its rear end elevated with respect to the front end thereof so that the packages or the like may move by gravity along each conveyor 14 toward the front end of said truck, thus facilitating loading of the conveyors 14. Likewise, an unloading station designed to utilize to the full the advantages of our invention may be provided with a ramp to incline the truck rearwardly, as indicated in Fig. 9, so that gravity assists in the unloading operation by causing rearward movement of the packages on each conveyor, as soon as the operator releases them by removal of the stop devices 30. With our invention, a truck provided with the load-carrying conveyor sections may be loaded in a very little time and with very little effort as compared with conditions commonly met with which necessitate much time-consuming and tedious labor on the part of the truck driver and others. With equal savings, a truck may be unloaded quickly and with a minimum of effort.

The load-handling and carrying mechanism of our invention is of special applicability in a situation where many packages produced or utilized, as in a production line, must be transported from one area to another, for example from one portion of a conveyor line to another or to a storage or shipping point. In such a situation, one or more trucks may be used, and each may be loaded quickly and easily by a single workman at the loading station, and the loading may be direct from a conveyor system. To this end, the truck is simply backed to loading position, the load-handling power conveyor is aligned successively with the several load-carrying conveyor sections and operated to discharge the package on to such sections. The packages will move from the handling conveyor directly to proper positions for a full load on the truck. The operator is free to move in the aisle between the two tiers of conveyors on the truck to straighten any package which may become misaligned, and to insert the stops 30 on the respective sections as they become filled. The whole loading operation takes but a few minutes, so that the truck may be used a maximum time and will be tied up with loading a minimum time, and so that the conveyor system from which the packages are delivered may operate at a usual rate and without congestion of packages at its delivery end.

To the same end, and to maintain a steady supply at the delivery point, the trucks may be unloaded in an equally short time at the delivery station by like operations performed in a reverse order.

Moreover, the trucks are always available for use in other situations or for general hauling. In such case, if the load is suitable, it may be loaded from the rear of the truck directly from a supply point and the load units placed on the rear end of the sections and pushed to full-load position. For unloading, the operator may move in the aisle between the tiers of sections to move the load easily along the conveyors to the rear for unloading. If the load is unsuitable to be carried on the tiers of sections, they may be moved, in whole or in part, to their folded storage positions, to make substantially the whole truck body available for general hauling, and the change may be made easily and quickly as occasion demands.

We claim:

In combination, a truck having a floor and side walls, the latter each being provided with a rigid supporting structure; oppositely disposed, vertically spaced tiers of roller conveyors extending longitudinally of said truck with the rollers of said conveyor extending transversely thereof, each of said conveyors along one edge thereof being hingedly affixed to said side walls and, at spaced intervals along the opposite edge thereof, being pivotally interconnected by unitary, spaced, upright members whereby each of said tiers of conveyors can, as a unit, be raised to an ineffective or nonload-carrying position, substantially flat against said side walls of said truck or lowered, as a unit, into an effective, horizontal, load-carrying position wherein said upright members rest upon said truck floor and serve as means for supporting said conveyors in load-carrying positions; releasable, spring-actuated latch means mounted on each of said side walls and operable to engage and retain its corresponding tiers of roller conveyors in non-load-carrying position upon the latter being moved thereinto, a load-handling station including a conveyor and elevating mechanism to align a free end of said conveyor into tandem relation with the outer end of a selected one of said tiers of roller conveyors; and shelf members projecting from the outer end of each roller conveyor of each tier serving as an aligning means and rest for said free end of said load-handling station conveyor.

IAN H. SMALL.
WILLIAM W. LOMAN.

REFERENCES CITED

The following references are of record in the file of this patent:

UNITED STATES PATENTS

| Number | Name | Date |
| --- | --- | --- |
| 531,859 | Plant | Jan. 1, 1895 |
| 1,184,595 | Wake | May 23, 1916 |
| 1,206,169 | Talbot | Nov. 28, 1916 |
| 1,276,674 | Mentzer et al. | Aug. 20, 1918 |
| 1,386,053 | Dyer | Aug. 2, 1921 |
| 1,473,850 | Greene | Nov. 13, 1923 |
| 1,727,048 | Cody | Sept. 3, 1929 |
| 1,730,480 | Shirreff | Oct. 8, 1929 |
| 2,002,009 | Hart | May 21, 1935 |
| 2,096,958 | Clerc | Oct. 26, 1937 |
| 2,212,702 | Scott | Aug. 27, 1940 |